United States Patent
Clark et al.

(10) Patent No.: US 6,871,067 B2
(45) Date of Patent: Mar. 22, 2005

(54) METHOD AND SYSTEM FOR COMMUNICATING TELEMATICS MESSAGES

(75) Inventors: Noel E. Clark, Bay City, MI (US); Steven J. Sinicki, Bay City, MI (US)

(73) Assignee: Electronic Data Systems Corporation, Plano, TX (US)

( * ) Notice: Subject to any disclaimer, the term of this patent is extended or adjusted under 35 U.S.C. 154(b) by 498 days.

(21) Appl. No.: 09/977,806

(22) Filed: Oct. 15, 2001

(65) Prior Publication Data

US 2003/0083079 A1 May 1, 2003

(51) Int. Cl.[7] ............................................. H04Q 7/20
(52) U.S. Cl. ................ 455/428; 455/466; 455/435.3; 455/41.2; 455/512
(58) Field of Search ............................ 455/428, 466, 455/435.3, 41.2, 512

(56) References Cited

U.S. PATENT DOCUMENTS

| | | | |
|---|---|---|---|
| 5,084,871 A | | 1/1992 | Carn et al. .................. 370/94.1 |
| 5,666,398 A | * | 9/1997 | Schiffel et al. ............. 370/280 |
| 6,145,082 A | | 11/2000 | Gannon et al. ............. 713/201 |
| 6,282,491 B1 | * | 8/2001 | Bochmann et al. ......... 701/209 |
| 6,459,904 B1 | * | 10/2002 | Lorello et al. .............. 455/466 |
| 6,686,880 B1 | * | 2/2004 | Marko et al. ............... 342/457 |
| 2002/0025802 A1 | * | 2/2002 | Dupuis ....................... 455/419 |
| 2002/0115436 A1 | * | 8/2002 | Howell et al. .............. 455/426 |
| 2002/0137500 A1 | * | 9/2002 | Brooking et al. ........... 455/419 |
| 2002/0140545 A1 | * | 10/2002 | Nietupski et al. .......... 340/5.72 |
| 2002/0173889 A1 | * | 11/2002 | Odinak et al. .............. 701/36 |
| 2003/0125849 A1 | * | 7/2003 | Braun et al. ................. 701/3 |

FOREIGN PATENT DOCUMENTS

| | | | |
|---|---|---|---|
| EP | 1 128 265 A1 | 8/2001 | ........... G06F/9/445 |
| WO | WO 00/77620 A2 | 12/2000 | ........... G06F/9/00 |
| WO | WO 00/77620 A3 | 12/2000 | ........... G06F/9/445 |

* cited by examiner

*Primary Examiner*—Sonny Trinh
*Assistant Examiner*—Huy Phan
(74) *Attorney, Agent, or Firm*—Baker Botts L.L.P.

(57) ABSTRACT

Disclosed is a method and system for communicating standardized telematic messages among a plurality of telematic devices. A telematic message is received by a message router from one of the telematic devices. The message router selects a destination device and transmits the message to the destination device, where the message is processed. In one embodiment, the message router determines whether the destination device is available to receive a message before transmitting the message. If the destination device is not available, the message is maintained in memory. In another embodiment, a time-to-live parameter is assigned to the message and the message is removed from memory of the time-to-live expires before the destination device becomes available. In a further embodiment, a priority parameter is assigned to the message and the processing of a prior message is interrupted if a new message is received that has a higher priority parameter than the previously received message.

34 Claims, 3 Drawing Sheets

METHOD AND SYSTEM FOR COMMUNICATING TELEMATICS MESSAGES

BACKGROUND OF INVENTION

The present invention relates to telematics and, more particularly, vehicular telematics.

Telematics is the combination of telecommunications and information systems, often in the context of vehicles. Vehicular telematic systems involve services such as roadside assistance, automatic crash notification to a central facility, in-car entertainment, in-car computing and navigation. A typical telematics system includes vehicle systems such as airbags, door locks, vehicle engine and a car radio connected to and capable of sending and/or receiving telematic messages over a data bus in the vehicle, commonly known as a vehicle bus. Other devices such as a wireless transceiver in communication with a terrestrial network, a navigation system and a user interface such as user display and input device and/or audio interface such as a speech recognition interface may also be present. The ability of these devices to intercommunicate makes telematic services possible. For example, if the vehicle is involved in an accident that causes the airbag to deploy, the telematics system can be designed to detect a telematic message generated by the airbag signifying the deployment of the airbag and transmit a message using the wireless transceiver to a terrestrial network, reporting that the vehicle has been in an accident. The system can further be designed to receive an audio message from the terrestrial network such as "paramedics are on the way", mute the car radio and broadcast the message over the car radio's speaker system.

Other possible services include in-vehicle navigation. A vehicle operator can input a desired destination using a user interface such as a voice recognition system or a personal digital assistant or similar device capable of accepting user input. The user interface communicates the desired location along with the vehicle's current location as reported by a Global Positioning System (GPS) antenna in the vehicle to a terrestrial network via a wireless transceiver. A trip route computer attached to the terrestrial network receives the message and computes an efficient route or trip sequence to the desired destination using methods well known to one skilled in the art. The computer then relays the computed route or trip sequence via the terrestrial network to a wireless transceiver in communication with the vehicle's wireless transceiver. The message is then passed to a navigation system capable of tracking the vehicle's progress along the route and alerting the vehicle operator when a change in direction is required.

Previous telematics systems employ proprietary communications techniques to communicate messages between telematic devices. As a result, new developments in telematic device hardware or services make prior telematic communication protocols obsolete and make upgrading of telematic systems in vehicles to incorporate the new developments difficult or impossible.

SUMMARY OF THE INVENTION

It is an object of the present invention to standardize the communication of messages between telematic devices. The object is accomplished through use of a message router, which uses a standardized message framework to receive and distribute message between telematic devices.

One aspect of the present invention is a method or system for communicating telematic messages among two or more telematic devices. A telematic message is generated by a telematic device and is received by a message router. The message router selects at least one of the telematic devices as a destination device to which to transmit the message and may modify the message before transmitting. The message is then transmitted to the selected destination device where it is processed.

In an exemplary embodiment of the invention, before transmitting the message to the destination device, the message router determines if the destination device is available to accept the message. If the destination device is not available to accept the message, which may occur if the destination device is processing a previous message or for other reasons, the message is maintained in a memory associated with the message router until the selected destination becomes available.

In a further exemplary embodiment where the destination device is unavailable, the message router assigns a time-to-live parameter to the message and removes the message from memory if the selected destination does not become available before the time-to-live expires.

In another exemplary embodiment of the present invention, a priority parameter is assigned to the message before it is transmitted to the destination device. If the destination device is unavailable to accept the message because the destination device is processing a previously received message, the message router determines whether the current message has a higher priority parameter than the previously received message. If the current message has a higher priority, the message router interrupts the processing of the previously received message and transmits the higher priority current message to the destination device for immediate processing.

In yet another exemplary embodiment, the message router determines which destination device to select for a particular message by examining the type of the message or the content of the message.

In a further exemplary embodiment, the telematic devices include a transceiver capable of sending and receiving messages wirelessly with a terrestrial network, such as the Internet. The messages are sent to a computer server attached to the Internet, where the message is processed in order to provide a telematic service such as roadside assistance or trip route generation.

In yet further exemplary embodiments, the telematic devices include a user interface device such as an audio interface, preferably capable of speech recognition and/or a visual display; a vehicle data bus which carries messages generated by and destined for vehicle components such as a car radio, airbag microprocessor, engine diagnostic microprocessor and door locks controller; and a navigation system capable of receiving trip sequences from a trip route generation computer and monitoring the progress of the vehicle along the trip sequence.

The present invention has the advantage of permitting numerous telematic devices to communicate messages through a central message router utilizing standardized communication techniques. Various embodiments of the present invention will have other advantages that will be apparent to those of ordinary skill in the art.

BRIEF DESCRIPTION OF THE DRAWINGS

For a more complete understanding of the present invention and the advantages thereof, reference is made to the following description, taken in connections with accompanying drawings, in which.

DESCRIPTION OF THE EXEMPLARY EMBODIMENTS

Figure 1:
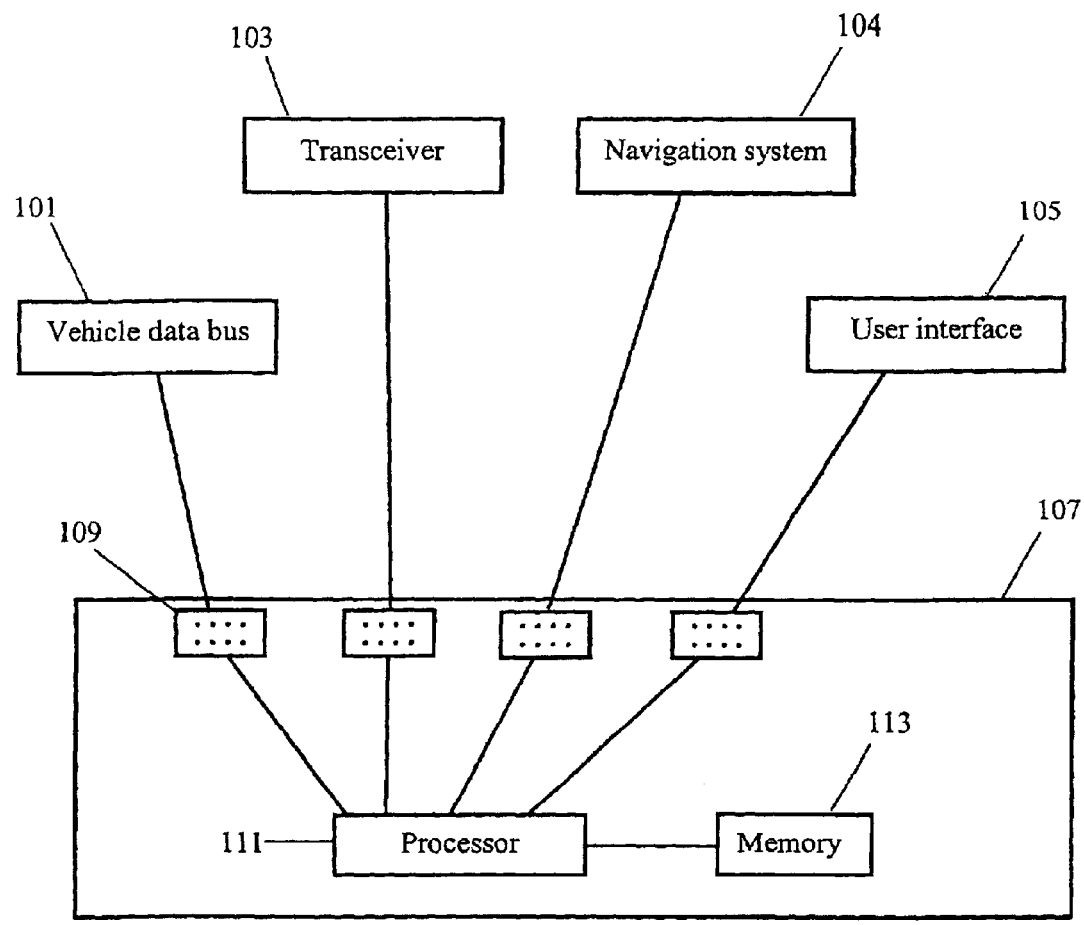
FIG. 1 illustrates a block diagram of a telematic messaging system in accordance with the teachings of the invention.
Figure 2:
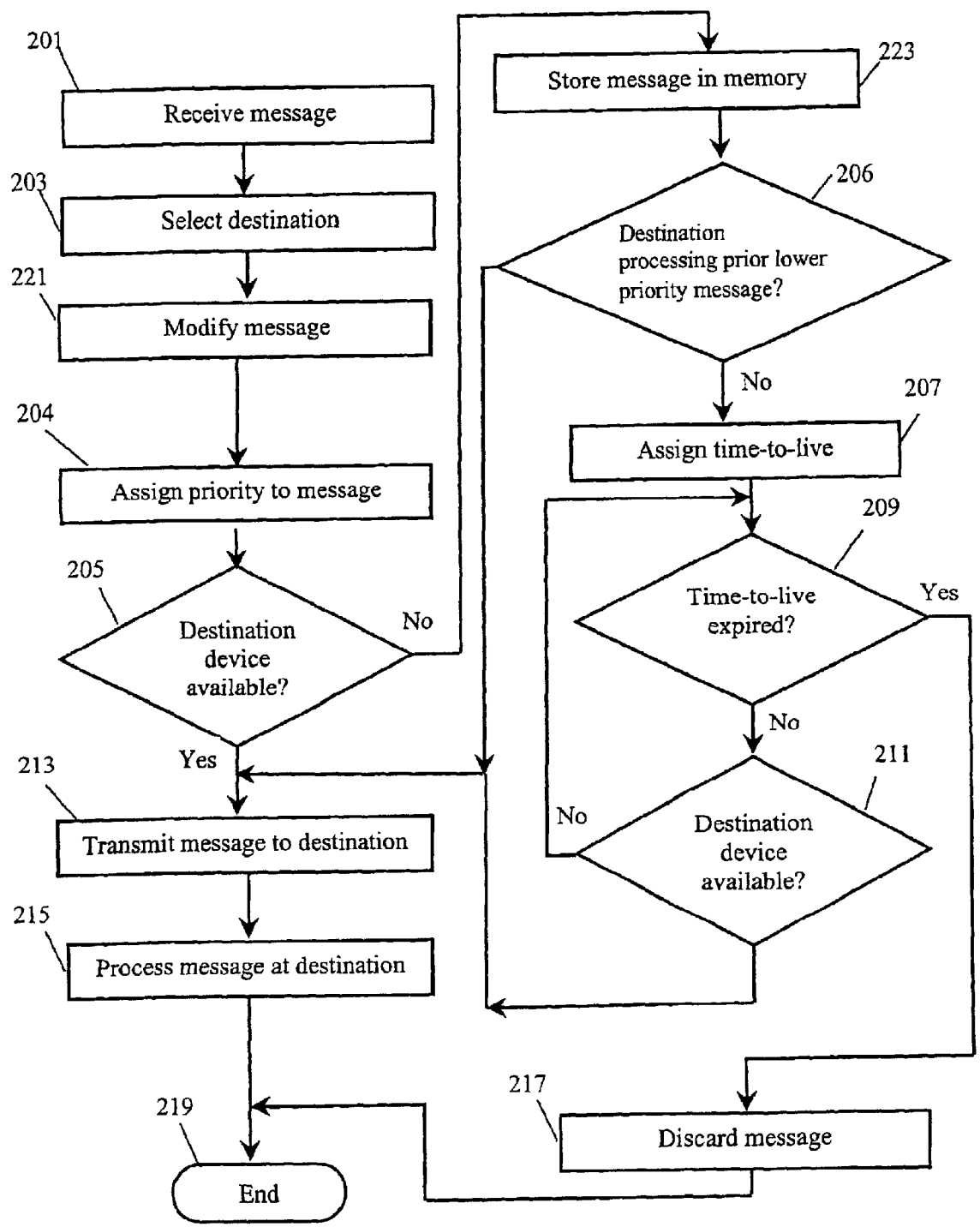
FIG. 2 illustrates a flow chart describing an exemplary method by which telematic messages may be communicated among telematic devices in accordance with the invention.
Figure 3:
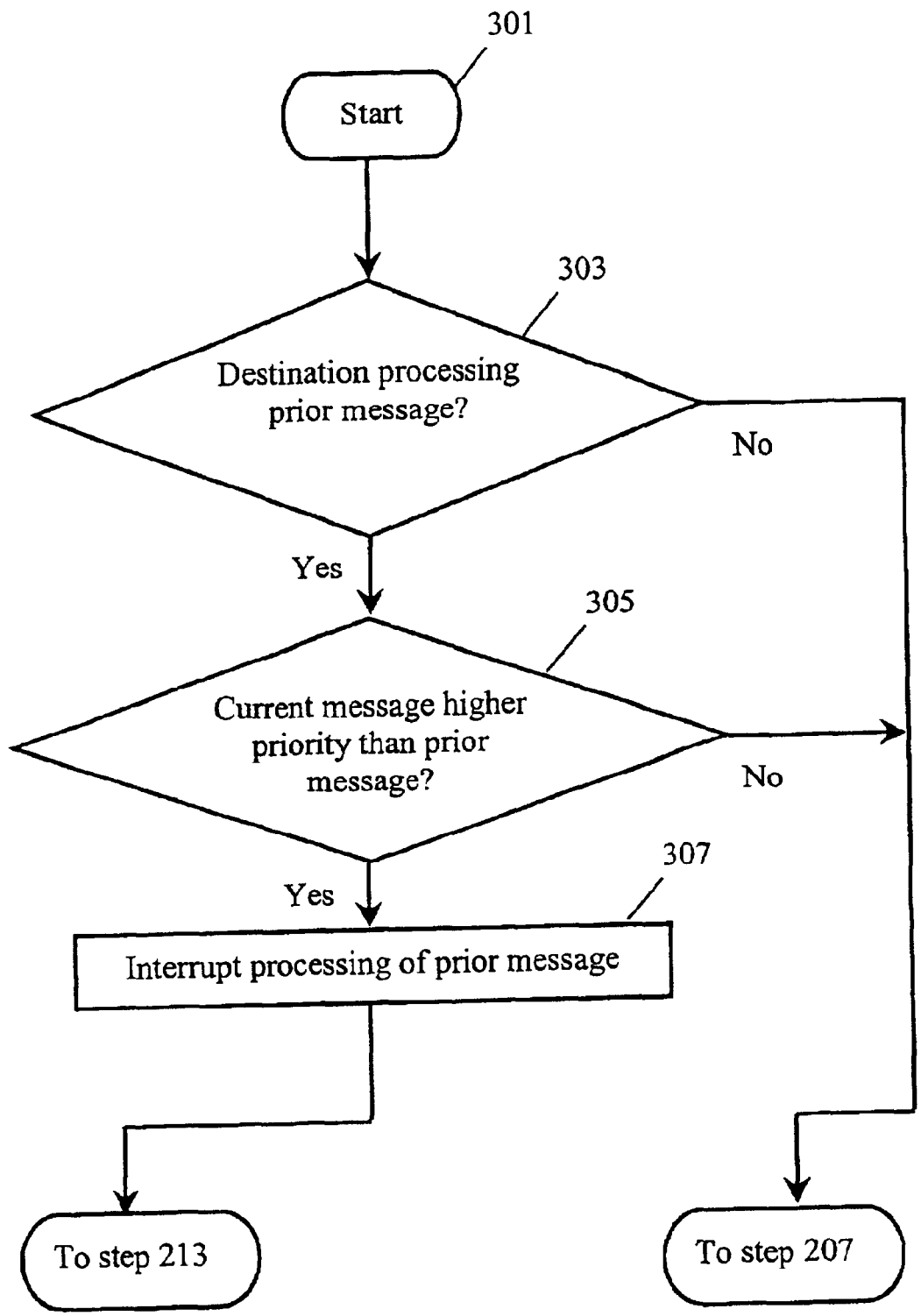
FIG. 3 illustrates a flow diagram of an exemplary method useful in the method of FIG. 2 for allowing messages to be processed according to their priority.

The exemplary embodiment of the present invention and its advantages are best understood by referring to FIGS. 1–3 of the drawings, the numerals being used for like and corresponding parts of the various drawings.

FIG. 1 illustrates an embodiment of a telematic system constructed in accordance with the teachings of the invention. Various telematic devices 101, 103, 104, 105 are connected to telematic message router 107. Message router 107 consists of input/output ports 109, telematic message processor 111 and associated memory 113. In the exemplary embodiment illustrated, the telematic devices shown are vehicle data bus 101, wireless transceiver 103, navigation system 104 and user interface 105. Numerous other telematic devices could be employed in addition to or in lieu of the devices illustrated.

Vehicle data bus 101 can be any number of vehicle data busses well known to one of ordinary skill in the art. Examples of such vehicle busses include the 1850 used in vehicles manufactured by Chrysler, Assembly Line Data Link (ALDL), ODBI or ODB 2 used in vehicles manufactured by General Motors and the CAN used in vehicles manufactured by Mercedes-Benz. Various vehicle components such as the engine diagnostic computer, airbag controller, door lock controller, and car radio use the data bus to send and receive messages relating to their current status. For example, the engine diagnostic computer may generate a certain message when the engine is overheating and the airbag controller may generate a certain message when the airbag deploys. Additionally, the car radio may detect a message on the vehicle bus to mute the volume of the car radio and respond accordingly. Typically, the vehicle bus will have an access port in the passenger compartment of the vehicle where the telematic message router may be connected to the vehicle bus via input/output port 109.

Wireless transceiver 103 can be any number of wireless communication devices capable of receiving and transmitting messages over a wireless connection to a terrestrial network. In an exemplary embodiment, wireless transceiver 103 consists of a cellular modem connected to a cellular telephone. The wireless modem accepts telematic messages and modulates the digital message data into an analog signal capable of being sent by the cellular phone to a cellular base station, which is connected to the public switched telephone network. In this fashion, the cellular phone can connect directly to a modem attached to a terrestrial computer capable of receiving telematic messages or can connect to an Internet Service Provider (ISP) modem bank, enabling the transmission of telematic messages from the telematic message router to a computer anywhere on the Internet that is capable of receiving telematic messages. The wireless modem also demodulates data received by the cellular telephone from the terrestrial network and converts that data into telematic messages for transmission to the telematic message router. The wireless modem may be connected to the cellular telephone either by a physical connection such as copper wire, or over a short range wireless communication connection such as Bluetooth. Alternatively, the wireless transceiver 103 may be a cellular digital packet data (CDPD) transceiver, which allows direct access to the Internet or other packet-switched networks without requiring a dedicated cellular telephone circuit connection.

Navigation system 104 can be any number of navigation systems that provide position information and optionally directions to a desired location to a vehicle operator. Such systems are well known to one of ordinary skill in the art. In the exemplary embodiment, the navigation system 104 is a Quick-Scout™ navigation system manufactured by Siemens Automotive. This system includes a GPS antenna which is used to periodically determine the position of the vehicle. The system also includes a processor which accepts trip route or trip sequence information generated by a trip route generation computer. The trip route is a sequence of road paths and turns between the original position to the desired destination. The processor also accepts current vehicle position information to track the progress of the vehicle along the trip route received from the trip route generation computer.

Vehicle position information may be provided by a GPS antenna, a dead reckoning system that monitors the vehicle speed such as via transmission sensors and directional changes, a combination of those systems or both, or by other methods well known to one of ordinary skill in the art.

The trip route generation computer uses a database of road information stored on a CD-ROM or other data storage device to calculate an efficient trip sequence from the vehicle position to the desired location using methods well known in the art. The database of road information includes road segment geographic positions, and can include other information such as traffic congestion, weather at the road locations and average speed of vehicles on the road segments. The trip generation computer can be in the vehicle, or can be a computer server at a central remote location, accessible by wireless communication using the wireless transceiver 103. In the exemplary embodiment, the trip generation computer providing the telematic service is located at a central remote location and is accessible by numerous vehicles each having wireless transceiver 103. Accordingly, the vehicle does not have to include devices for storing and reading from a road information database. Moreover, when road information changes due to road construction and/or road maintenance, the road information database can be updated once at the central location rather than requiring copies of a road information database in vehicles to be updated. Further, the road information stored at the central location can be updated throughout the day to include information about traffic congestion, average speed driven by drivers on the road segment and/or weather conditions on the various road segments in the database. This information may then be used by the trip generation computer in calculating the most efficient route to the desired destination.

In calculating trip sequences, the vehicle position and desired destination are provided to the trip generation computer. In the exemplary embodiment, the vehicle position consists of latitude and longitude information provided by the GPS antenna of the navigation system. The desired destination is received from the user interface 105, discussed below. The vehicle operator may provide the desired destination in any number of forms that will be apparent to one of ordinary skill in the art and the system should be capable of translating one or all of those forms of destination information into position information on the road information database. Examples of desired destination information include a street address or an intersection of two roads. The trip generation computer would compare the desired destination with its road information database to find the geographic coordinates of the destination. The computer may then calculate an efficient route from the current vehicle location to those coordinates. Alternatively, the user may input a business or residence name or a desired landmark, such as a building or airport. The trip generation computer would correlate this information to a street address using either the road information database or a separate information database such as a telephone directory. The separate database could be maintained at the central location, or at a remote location accessible by a computer network, such as the Internet. Having determined an address correlated to the desired destination, the trip computer could generate destination coordinates in the same manner as if the user had entered the address directly and compute the trip sequence to the desired destination.

User interface 105 allows a vehicle occupant to receive messages from and send messages to the various telematic devices. In the exemplary embodiment, the user interface 105 is a personal digital assistant programmed to generate and receive telematic messages from the telematic message router 107. In the exemplary embodiment, user interface 105 includes functionality for generating an emergency message to be sent to a central monitoring facility via wireless transceiver 103; for specifying trip destination information to be sent to navigation system 104 as previously described; and may include other functionality such as for requesting news or other information such as a traffic report from a remote computer via wireless transceiver 103. User interface 105 also has functionality for displaying navigation information such as current direction, estimated time to the next course change along a trip route, and directions to make an immediate change in direction. User interface 105 may include functionality for verbal interface with the user, such as voice recognition capability to receive messages from a vehicle occupant and/or the capability to verbally communicate messages to the vehicle operator over the vehicle speaker system, or through some other audio system. The verbal messages to be communicated to the vehicle operator may be prerecorded and stored in a memory device associated with the message router, synthesized from text data or received via wireless transceiver 103 from a remote location.

In the exemplary embodiment, input/output ports 109 are RS-232 serial ports. Although four such ports are shown in FIG. 1, it will be understood that more or fewer of such ports may be present. One or more telematic devices may share the same port 109 using techniques well-known to one of ordinary skill in the art. Moreover, separate input and output ports could be used to communicate with one or more of the telematic devices. Input/output ports 109 may be embodied as any number of other interfaces, such as the Universal Serial Bus, IEEE 1394 High Speed Serial Bus, or a wireless interface such as Bluetooth.

Message router processor 111 may be any type of programmable general purpose processor. In the exemplary embodiment, processor 111 is a Motorola MPC823 microprocessor running the Linux operating system. Associated memory 113 may be any form of computer readable and writable memory such as a hard disk drive, Random Access Memory, or both.

An exemplary embodiment of a method for communicating telematic messages among telematic devices is illustrated in FIG. 2. In step 201, a telematic message router receives a message from a telematic device. In an exemplary embodiment, the telematic messages are of the following standard format, although, as described herein, it is not necessary for messages from telematic devices to originate in this format. When messages are not received in this format, the message router may convert messages into the standardized format:

| Field | Soucre | Destination | Message ID | Payload | Time To Live | Priority |
| --- | --- | --- | --- | --- | --- | --- |
| size | 4 bytes | 4 bytes | 4 bytes | Variable | 4 bytes | 4 bytes |

The source and destination fields are populated with an identifier of the device originating the message and the device to which the message is addressed. The telematic devices may be divided into various classes based on type of device under consideration. For example, indentifiers 1000–1999 may be reserved for User Interface devices. Within that range, subclasses of devices may have particular identifiers. For example, identifiers 1100–1199 may be reserved for personal digital assistants, identifiers 1200–1299 may be reserved for radio display devices, and identifiers 1300–1399 may be reserved for heads up display devices. Other classes of devices in the preferred embodiment include vehicle objects such as devices attached to a vehicle bus (2000–2099), navigation devices (3000–3999), wireless devices (4000–4999), and terrestrial network based services (5000–5999), such as roadside assistance or a trip route information request.

The Message ID field identifies the message's type. For instance, possible message types include: 00000000 (airbag deployed), 00000001 (emergency situation), 00000002 (roadside assistance requested). The Message ID field is used by the destination device to determine what type of message is being received. Numerous other message types exist and it will be apparent to one of ordinary skill in the art that the present invention may be expanded to include all current and future telematic message types and functions.

The Payload field includes actual data to be passed between the source and destination. Some messages types may include no payload while others have substantial payload. Some message types will have particularized payload structure. For example, messages intended for wireless communication over the terrestrial network may utilize a particularized payload structure discussed herein. Whatever the content of the payload field, it is not necessary for the message router to understand the message payload. Because the overall message length is variable, the message router will determine the end of a message by detecting the source and/or destination information at the beginning of a new message. In this way the message router is an standardized delivery mechanism for communicating arbitrary messages among the known community of telematic devices.

The Time-to-live field includes information about the time-to-live parameter of the message. This information is preferably a future time certain when the message should be discarded. The time-to-live information is derived by adding a predetermined amount of time to the current time when the message arrives. As described herein, when the current time is beyond the time in the time-to-live field of the message, the message is discarded.

The Priority field indicates the priority of the message relative to all other messages. This field may consist of an integer value, with lower values representing higher priority messages. The use of the priority field is described in detail herein.

In the case of messages intended for wireless communication to or from the terrestrial network, an exemplary embodiment makes use of a specialized version of the message framework previously described. Messages sent from the message router to the terrestrial network may be sent using the TCP/IP protocol and addressed to an Internet Address of a terrestrial server using a port registered with the Internet Address Naming Authority, such as port 8003. In an exemplary embodiment, the payload field of wireless messages are of the following standard format:

| Field | Service Identifier | Mobile Information Number | IP Address | Payload Length | Wireless Data Payload |
|---|---|---|---|---|---|
| size | 5 bytes | 10 bytes | 16 bytes | 8 bytes | Variable |

The Service Identifier field contains a unique number assigned by the FCC to identify the cellular carrier of the wireless communication.

The Mobile Information Number field contains the cellular phone number of the transceiver making the request.

The Internet Protocol Address field contains the IP address of the device that is requesting the service.

The Data Payload Length field contains the length of the wireless data payload in bytes.

The Wireless Data Payload field contains the data to be acted upon. For example in an airbag deployment message (Message ID: 00000000), the wireless data payload may include the latitude and longitude of the vehicle's present location in decimal format to assist in dispatching emergency personnel to the vehicle's location.

Returning again to FIG. 2, once a message has been received by the message router, a destination for the received telematic message is selected in step 203 based on a characteristic of the message. In the exemplary embodiment, the selection of a destination is made by examining the type of the message. For example, if the message is that the airbag has deployed, the message router 107 will know to route the message to the wireless transceiver 103 for transmission to a remote facility via the terrestrial network. Moreover, the message router 107 may select more than one destination for a particular message. For example, if a message is received that the car engine is overheating, that message might be directed to the user interface 105 for display to the user as well as to the wireless transceiver 103 for communication via the terrestrial network to a central monitoring facility. When a new telematic device is added to the system, the device, as part of its initialization routine, may inform the message router which message types it should receive and the message router may use this information when determining to which device or devices to route a particular message.

In step 221, the message router 107 may optionally modify the message before it is transmitted to a destination device. For example, a message received from a vehicle bus may consist of a coded data. The router may convert the coded data message into a particular message type with associated Message ID described previously. For example, if the coded data such as hexadecimal code "A012" received from a vehicle bus corresponds to the deployment of the airbag, the message router could convert that message to the Message ID "00000000", described previously. This process is assisted by software objects instantiated in the message router processor that correspond to each telematic device. These software objects are responsible for interfacing with the telematic devices and converting the device specific telematic messages into messages in accordance with the standardized format. Once properly formatted, the messages are sent to the message manager portion of the message router which performs the message routing, prioritization and time-to-live functions described herein. The device specific software objects may add information to the payload corresponding to the message type, such as a plain language description of the message to be displayed on a user interface device. The modification may be assisted by a dictionary of raw telematic messages and their translated meanings for each telematic device. The message dictionary may be stored in the memory 113 associated with the message router 107 and may be accessed by the message router during step 221. Alternatively or in addition, modification of messages may occur at the destination device or the software object corresponding to the destination device.

In step 204, a priority parameter is assigned to the telematic message before it is transmitted to the selected destination. This is an optional step useful where it is desired to prioritize the delivery of messages to particular selected devices, and is further described with reference to FIG. 3 herein.

In step 205, the message router 107 determines whether the destination device is available to receive a message. This is an optional step useful in an exemplary embodiment where various of the telematic devices may be unavailable to accept messages for some period of time. For example, the wireless transceiver may be unable to accept a message from the message router 107 for transmission to a terrestrial network because it is currently transmitting a previously received telematic messages, because there is no terrestrial network in wireless communication range, or for some other reason. If in step 205, the message router 107 determines that the selected device is available, the process continues to step 213 and the message is transmitted to the selected destination device. If in step 205, the message router 107 determines that the selected device is not available, the process proceeds to step 223 where the message is stored in the memory 113 associated with the message router 107. In one embodiment of step 205, the message maintains a queue of messages in memory 113 intended for delivery to a particular destination device. Once a message is transmitted to the destination device for processing, the message router 107 will await a confirmation that the message has been processed. If a new message intended for that destination device is received before the confirmation that the previous message was processed is received by the message router, the message router 107 will conclude that the destination device is not available and proceed to step 223. In another embodiment, the message router 107 could interrogate the selected destination device to determine if it is available to receive a telematic message. If it is not required or desired to detect whether the destination device is available, the process may proceed directly from step 221 to step 213 where the message is transmitted to the selected destination device.

Once the telematic message is stored in memory 113 associated with the message router 107, the process proceeds to optional step 206 wherein the message router 107, determines whether the selected destination device is processing a previously received message with a lower priority parameter than the currently received message. Step 206 is discussed in more detail herein with reference to FIG. 3. If the destination device is not processing a previously received message (and is therefore unavailable for some other reason as determined in step 205), or if the destination device is processing a previously received message with a higher priority parameter than the current message, or if optional step 206 is not performed, then the process proceeds to optional step 207 where a time-to-live parameter is assigned. Otherwise the process proceeds to step 213, discussed in detail herein.

A time-to-live parameter indicates how long the message should persist in the message router memory before it should be discarded as irrelevant due to its age. For example, if a user has requested a traffic report from a remote computer accessible via the wireless transceiver 103, but the wireless transceiver does not become available for a relative long period of time, such as thirty minutes, the request may no longer be relevant to the vehicle operator and the system can discard it automatically upon the termination of the message's time-to-live parameter. The time-to-live parameter could be specified in number of seconds, minutes, hours or some other unit that would serve as a proxy for temporal duration such as message processor cycles. Once the time-to-live parameter is assigned, the process proceeds to step 209 where the message router 107 determines if the time-to-live for that message has expired. In one embodiment, this step consists of determining if the time-to-live is greater than zero. If the time-to-live is greater than zero, the time-to-live is decremented to indicate the passage of time and the process proceeds to step 211. If the message has expired, the process proceeds to step 217 where the message is discarded and then to step 219 where the process ends. Alternatively, step 207 could include assigning the message's time-to-live amount as well as storing the time the message was received by the message router 107. In that case, step 209 would involve comparing the difference of the current time and the time the message was received by the message router 107 with the message's time-to-live and discarding the message if the relevant amount of time has passed since the message was received. If the time-to-live parameter has not expired, the process continues to step 211 where the message router 107 again determines whether the destination device is available. This step is identical to step 205 previously discussed. If the device is not available, the process returns to step 209, otherwise the process continues to step 213 where the message is transmitted to the selected destination device.

If it is not desired to utilize time-to-live parameters to monitor the relevance of messages, the process may proceed directly from step 223 to step 211 whereby the message remains stored in memory 113 until the selected destination device becomes available. Neither step 207 nor step 209 would be performed in this embodiment.

Once the message has been transmitted to the selected destination device, such as via the input/output ports 109 shown in FIG. 1, the message is processed by the selected destination device. The processing of message data by the various telematic devices will take a different form depending on the device and its functionality. For example, upon receiving trip sequence information from the wireless transceiver 103, the navigation system 104 might begin tracking the vehicle's movement along the trip sequence. The vehicle's position might be determined from sensors, such as a GPS antenna which forms a part of the navigation system 104, or from messages received from other telematic devices such as from vehicle transmission sensors communicating via the vehicle bus.

As another example, upon receipt of a telematic message destined for a particular computer server on the Internet, such as a trip route generation computer, the wireless transceiver 103 may dial a telephone number of an ISP modem bank, establish an Internet connection using the Point-to-Point Protocol or other well-known Internet communication protocol, modulate the received telematic message destined for the trip generation computer into data capable of being transmitted over the analog wireless connection, and transmit the modulated data over the analog wireless connection to the ISP modem, where the processed telematic message is then demodulated and routed via the Internet to the destination trip generation computer using techniques well known to one of ordinary skill in the art. The wireless transceiver 103 may then wait for a response message from the trip generation computer, or may end the wireless connection. If the wireless transceiver 103 waits for a response message, that message would be demodulated into a telematic message and forwarded to the message router 107 as a new telematic message and the process previously described would repeat beginning at step 201. Other examples of processing step 215 for other potential telematic applications or services are too numerous to set out here but will be apparent to one of ordinary skill in the art in view of the previously described advantage of the present invention, i.e. its adaptability to communications among numerous telematic devices performing different functions.

Referring now to FIGS. 2 and 3, an exemplary embodiment of a telematic message prioritization framework, providing further detail of step 206, is illustrated. In step 204 a priority parameter is assigned to a received telematic message. The priority parameter is assigned using predetermined rules based on the content, source, and/or destination of the telematic message. For example, a message from the user device requesting traffic information from a terrestrial network via the wireless transceiver 103 might be given a relatively low priority, while a message that the airbag has deployed destined for a remote monitoring facility might be given the highest priority.

In step 205, if the destination device, such as the wireless transceiver 103, is not available to receive the telematic message, the process proceeds to step 223 where the message is stored in memory, then to step 301. From step 301 the process proceeds to step 303 where it is determined if the selected destination device is processing a prior message. As previously discussed with respect to step 205, this might be determined by using a message queue to hold messages destined for a particular destination device. Once a message is passed to the selected destination device for processing, the message router 107 waits for a confirmation from the selected device that it has completed processing the received message. If the confirmation has not been received before a new message is received by the message router 107 and step 303 is reached, the message router may conclude that the destination device is still processing the prior message. In this case, the process proceeds to step 305. If the message router 107 concludes that the destination device is not processing a previously received message (and therefore is unavailable for other reasons, such as being out of a wireless service area), the process returns to step 207 shown in FIG. 2, described previously.

In step 305, the message router 107 determines whether the recently received message has a higher priority parameter than the message previously sent to the destination device. This is accomplished by performing a simple comparison of the priority parameters of the newly received message with the message for which the message router 107 has yet to receive a confirmation of completed processing by the destination device. If the newly received message does not have a higher priority parameter than the prior message, the process again returns to step 207 shown in FIG. 2, described previously.

If the message router 107 concludes that the newly received message does have a higher priority parameter than the prior message, the process proceeds to step 307 where the message router 107 interrupts the processing of the prior message by the destination device. According to the exemplary embodiment described, the interrupted message may be returned to the message queue associated with the destination device for processing after the processing of the higher priority message has been completed. Once the destination device's processing of the prior message has been interrupted, the process returns to step 213 shown in FIG. 2, wherein, as described previously, the newly received message is transmitted to the destination device for processing.

Although the present invention has been described in detail, it should be understood that various changes, substitutions and alterations can be made hereto without departing from the scope or spirit of the invention as defined by the appended claims.

We claim:

1. A method for communicating telematic messages among a plurality of telematic devices using a message router, comprising:
   receiving by the message router, a telematic message generated by a first telematic device comprising one of said plurality of telematic devices wherein the message router and the first telematic device are located in a vehicle;
   converting the telematic message into a first translated message having a standard format using a first software object contained in the router and associated with the first telematic device;
   using the message router to process the first translated message and select at least a second telematic device comprising one of said plurality of telematic devices as a destination device to which to communicate the first translated message based on a characteristic of the first translated message;
   converting the first translated message into a second translated message using a second software object contained in the router and associated with the second telematic device; and
   transmitting by the message router the second translated message to the second telematic device.

2. The method of claim 1, further comprising:
   determining whether the second telematic device is available to accept the second translated message, and
   if the second telematic device is not available, maintaining the second translated message in a memory associated with the message router until the second telematic device becomes available.

3. The method of claim 2, further comprising:
   assigning a time-to-live parameter to the second translated message; and
   removing the second translated message from the memory if the time-to-live parameter expires before the second telematic device becomes available to accept the second translated message.

4. The method of claim 2, further comprising: assigning a priority parameter to the second translated message.

5. The method of claim 4, wherein the second telematic device is unavailable to accept the second translated message because it has not completed processing a previously received telematic message, further comprising:
   determining whether the second translated message stored in the memory has a higher priority parameter than the previously received telematic message; and
   if the second translated message stored in the memory has a higher priority parameter than the previously received telematic message, interrupting the processing of the previously received telematic message, and transmitting the second translated message stored in the memory to the second telematic device for processing.

6. The method of claim 1, wherein the second telematic device is selected based on the type of the telematic message.

7. The method of claim 1, wherein the second telematic device is selected based on the content of the telematic message.

8. The method of claim 1, wherein at least one of said plurality of telematic devices is a wireless transceiver capable of communicating with at least one device attached to a terrestrial network.

9. The method of claim 8, wherein said terrestrial network is the Internet.

10. The method of claim 8, wherein said at least one device attached to said terrestrial network is a computer server providing at least one telematic service.

11. The method of claim 1, wherein at least one of said plurality of telematic devices is a user interface device.

12. The method of claim 11, wherein said user interface device includes an audio interface.

13. The method of claim 11, wherein said user interface includes a visual display.

14. The method of claim 1, wherein at least one of said plurality of telematic devices is a vehicle data bus.

15. The method of claim 1, wherein at least one of said plurality of telematic devices is a navigation system.

16. The method of claim 15, wherein at least one of said plurality of telematic devices is a wireless transceiver capable of communicating with at least one device attached to a terrestrial network and wherein said navigation system utilizes data stored on a computer readable storage medium attached to said terrestrial network.

17. The method of claim 1, further comprising initializing at least one of the plurality of telematic devices comprising:
   communicating by the at least one of the plurality of telematic devices to the message router at least one desired message type; and
   storing the at least one desired message type in a memory associated with the message router; and
   wherein selecting at least a second telematic device is based on the at least one desired message type.

18. A telematic message router comprising:
   a first port operable to accent a telematic message from a first telematic device located in a vehicle;
   a processor, coupled to the first input, the processor operable to execute computer software, the computer software operable to
      convert the telematic message into a first translated message having a standard format using a first software object contained in the router and associated with the first telematic device;

process the first translated message and select at least a second telematic device as a destination device to which to communicate the first translated message based on a characteristic of the first translated message; and convert the first translated message into a second translated message using a second software object contained in the router and associated with the second telematic device;

a second port coupled to the processor and to a second telematic device and operable to send the second translated message to the second telematic device; and wherein the telematic message router is located in the vehicle.

19. The telematic message router of claim 18, wherein the processor is further operable to determine whether the second telematic device is available to accept the second translated message, and further comprising a memory accessible by the processor for storing the second translated message until the second telematic device becomes available.

20. The telematic message router of claim 19, wherein the processor is further operable to assign a time-to-live parameter to the second translated message stored in the memory, and to remove the second translated message from the memory if the time-to-live parameter expires before the second telematic device becomes available to accept the second translated message.

21. The telematic message router of claim 19, wherein the processor is further operable to assign a priority parameter to the second translated message.

22. The telematic message router of claim 21, wherein said processor is further operable to:

determine whether the second telematic device is unavailable because it has not completed processing a previously received telematic message;

determine whether the second translated message stored in the memory has a higher priority parameter than the previously received telematic message; and interrupt the processing of the previously received telematic message and transmit the second translated message stored in the memory to the second telematic device for processing if the second translated message stored in the memory has a higher priority parameter than the previously received telematic message.

23. The telematic message router of claim 18, wherein the processor selects the second telematic device based on the type of the telematic message.

24. The telematic message router of claim 18, wherein the processor selects the second telematic device based on the content of the telematic message.

25. The telematic message router of claim 18, further comprising a terrestrial network and at least one device attached to the terrestrial network, wherein the first telematic device is a wireless transceiver capable of communicating with the at least one device via the terrestrial network.

26. The telematic message router of claim 25, wherein the terrestrial network is the Internet.

27. The telematic message router of claim 25, wherein the at least one device attached to the terrestrial network is a computer server providing at least one telematic service.

28. The telematic message router of claim 18, wherein the at least one telematic device is a user interface.

29. The telematic message router of claim 28, wherein the user interface comprises an audio interface.

30. The telematic message router of claim 28, wherein the user interface comprises a visual display.

31. The telematic message router of claim 18, wherein the first telematic device is a vehicle data bus.

32. The telematic message router of claim 18, wherein the first telematic device is a navigation system.

33. The telematic message vrouter of claim 32, further comprising a terrestrial network and at least one device attached to the terrestrial network, wherein the first telematic device is a wireless transceiver capable of communicating with the at least one device via the terrestrial network and wherein the navigation system utilizes data stored on the at least one device attached to the terrestrial network.

34. The telematic message router of claim 18, wherein the processor is further operable to receive initialization data from the second telematic device, the initialization data comprising at least one desired message type, wherein the processor selects the second telematic device as the destination device based on the at least one desired message type.

* * * * *